United States Patent [19]
Engel et al.

[11] 3,743,949
[45] July 3, 1973

[54] RMS SENSING APPARATUS

[75] Inventors: Joseph C. Engel; Robert T. Elms, both of Monroeville, Pa.

[73] Assignee: Westinghouse Electric Corporation, Pittsburgh, Pa.

[22] Filed: July 23, 1971

[21] Appl. No.: 165,462

[52] U.S. Cl. .............................. 328/144, 235/193.5
[51] Int. Cl. .............................................. G06g 7/20
[58] Field of Search ........................... 328/144, 145; 235/158, 193–193.5; 324/132

[56] References Cited
UNITED STATES PATENTS

| | | | |
|---|---|---|---|
| 3,423,578 | 1/1969 | Platzer | 235/193.5 |
| 3,152,250 | 10/1964 | Platzer | 235/193 |
| 3,064,192 | 11/1962 | Schwarzlander | 328/144 |
| 3,070,302 | 12/1962 | Fluegel | 328/144 |
| 3,281,689 | 10/1966 | Schneider | 328/144 |
| 3,398,297 | 8/1968 | Huen | 328/144 |

*Primary Examiner*—John W. Huckert
*Assistant Examiner*—R. E. Hart
*Attorney*—A. T. Stratton, John L. Stoughton et al.

[57] ABSTRACT

An RMS sensing device wherein a first electrical quantity proportional to the square of at least a portion of an electrical quantity to be measured is established, by passing the desired portion of the quantity to be measured through two p-n junctions in series, and thereafter using the first electrical quantity to control the flow of current through an output circuit comprising two more p-n junctions connected in series and including a capacitor connected in shunt with a selected one of the p-n junctions of the output circuit to eliminate the alternating current component from the selected p-n junction whereby the direct current flowing through the output circuit is a direct measurement of the RMS of the quantity which is being measured.

28 Claims, 3 Drawing Figures

3,743,949

3,743,949

RMS SENSING APPARATUS

BRIEF SUMMARY OF THE INVENTION

This invention is directed to a transducer which uses a minimum of elements for providing a direct current output signal which is directly proportional to the RMS value of the alternating quantity applied to the input terminals of the transducer which comprises a first set of p-n junctions providing a log output which is proportional to the square of the input signal and apparatus for taking the antilog of this output signal with a network similar to the network which provided the log signal except that the antilog network is provided with means for bypassing the alternating current components of the current flowing in the outputs circuit around one of the p-n junctions of the antilog circuit.

DETAILED DESCRIPTION

Figure 1:
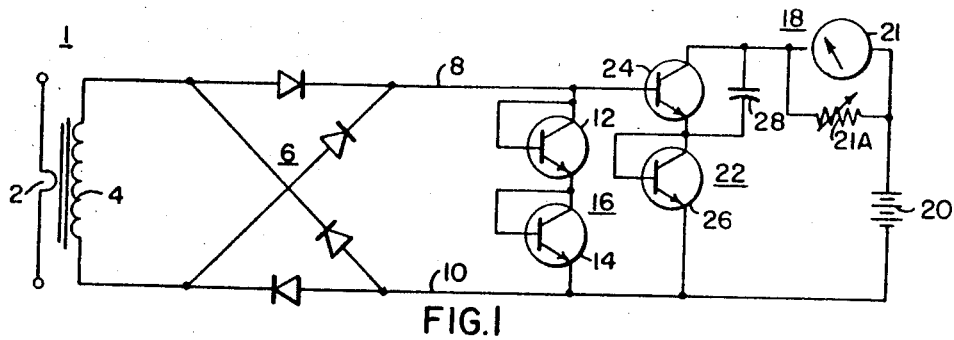
FIG. 1 is a schematic diagram showing a transducer embodying the invention.

Referring to the drawings by characters of reference and more particularly to FIG. 1, the numeral 1 indicates generally a current transformer having a primary winding connected to be energized by an alternating electrical current quantity, the RMS value of which is to be determined. The transformer 1 has a secondary or output winding 4 connected through a full wave rectifier bridge 6 to positive and negative buses 8 and 10.

A first pair of transistors 12 and 14, arranged with their bases connected to their collectors whereby they operate as rectifiers, are connected in series to provide a log potential generating circuit which is connected between the buses 8 and 10. These transistors 12 and 14, which will sometimes hereinafter be referred as diodes 12 and 14, each include a p-n junction through which current flows between the positive bus 8 and the negative bus 10. As is known in the art, a p-n semiconductor junction exhibits a logarithmic relationship between the magnitude of the current flowing therethrough and the magnitude of the voltage established thereacross. Therefore the magnitude of the voltage established between the buses 8 and 10 due to current flow through the primary winding 2 of the current transformer 1 will have a magnitude which is directly proportional to the log of the square of the alternating quantity of the current slowing through the winding 2.

An output circuit 18 is energized from a source of unidirectional potential illustrated as a battery 20. The positive terminal of source 20 is connected through a direct current indicating instrument 21 to an antilog circuit 22. The antilog circuit comprises the collector and emitter of a transistor 24, and the collector and emitter of a transistor 26. The antilog circuit is in turn connected to the negative terminal of the battery 20. The base of the transistor 26 is connected to the collector thereof whereby the transistor 26 acts as a p-n junction diode. A capacitor 28 is connected in shunt with the collector-emitter circuit of the transistor 24. The capacitor 28 is of sufficient capacity to cause the alternating current portion or component of the current flowing in the antilog circuit 22 to circulate solely through the transistor 24 whereby the current flowing in the remainder of the output circuit 18 is a direct current of a magnitude proportional to the RMS of the alternating current being measured. A suitable capacitor 28 would have upwardly of 10 mfd for a 60Hz applied current to the transformer 1 whereby the sum of the changing current of the capacitor 28 and the antilog current through the transistor 24 is substantially constant over each half cycle of a constant applied current to the transformer 1.

The base of the transistor 24 is connected to the positive bus 8 and the emitter of the transistor 26 is connected to the bus 10, whereby the base drive current in the transistor 24 flows in accordance with the potential established across the log potential generating circuit 16. The output circuit is calibrated by a variable resistor 21A shunted around the instrument 21 which compensates for the differences in the multiplying factors of the devices 12, 14, 24 and 26.

As will be proved mathematically below, the direct current component of the pulsating current flowing through the output circuit 18 or 18' has a magnitude which is directly proportional to the RMS magnitude of the current flowing in the primary to the current transformer 1.

Figure 2:
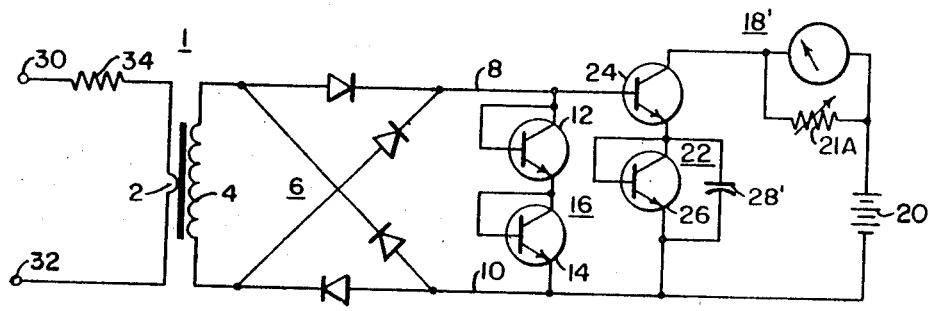
FIG. 2 is a schematic diagram showing a modified form transducer embodying the invention; and, FIG. 3 is a schematic diagram showing a still further modified form of transducer embodying the invention.

As illustrated in FIG. 2, the buses 8 and 10 may be energized in accordance with the log of the square of the voltage applied to the input terminal 30 and 32 since the current flow through the primary winding 2 is controlled by a resistor 34 and will vary as a function of the magnitude of the voltage at the terminals 30-32. In the FIG. 2 arrangement the capacitor 28' is connected in shunt with the collector-emitter circuit of the transistor 26 and its capacity is large to pass all of the alternating component of the current flowing through the antilog circuit 22'. In the form of the invention of FIG. 2, the capacitor 28' should have higher capacity than the capacitor 28 and in most instances will be upwards of 50 mfd. This is because of the lower effective impedance of the discharge circuit for the capacitor 28'. In FIG. 2 the current flow through the device 26 will be substantially constant and the current through the remainder of the output circuit 18' will have an alternating component. With a damped DC instrument 21, the AC component will not be indicated and the instrument 21 will read the true RMS of the current through the transformer which in FIG. 2 is a measure of the RMS of the voltage applied to terminals 30 and 32.

The letter $x$ is equal to the instantaneous magnitude of the pulsating input quantity supplied by the winding 4, the letter $i_o$ is equal to the instantaneous magnitude of the DC quantity or component flowing in the output circuit 18, the letter $i_{ac}$ is equal to the instantaneous magnitude of the ac quantity or component in the output circuit 18, and the letter $i$ is equal to the instantaneous magnitude of the total of the ac and dc quantities flowing in the output circuit 18.

By definition, the alternating component $i_{ac}$ of a periodic quantity is a quantity which when averaged throughout the complete period T of the recurring periodic quantity of zero value. In an instance in which a sine wave is applied to the transformer winding 2, the complete period T of the recurring components supplied by the full wave rectifier will be equal to one half the period $2\pi$ of the supplied sine wave $\omega t$. In the event the wave supplied to the transformer is not symmetrical about its zero axis but otherwise repeats itself, the full or complete period T of the alternating component would be the same as the period of the supplied wave. Also by definition $x_p$ of a periodic quantity is a quantity which varies in magnitude but not polarity during the period T as above defined.

The capital letter with the subscript RMS added represents the RMS value of the quantity represented by the same lower case letter. A multiplying constant which depends upon the area of the p-n junction is represented by the letters $k_1$, $k_2$, $k_3$ and $k_4$. The base of the log depends upon the doping of the p-n junction. The doping of like p-n junction is held rather closely and all of the p-n junctions may be assumed to be the same so that the log base, not indicated, is the same for all of the p-n junctions. The area for the four p-n junctions will normally be substantially alike so that the error produced thereby will be no greater than ±5 percent. This small error may be compensated by the proper adjustment of the calibrating resistor 21A.

The mathematical solution for a pulsating input quantity having a time period T is as follows:

$$\log(K_3 i_o) + \log(K_4 i) = \log(K_1 x) + \log(K_2 x) \quad (1)$$

$$\log(K_3 K_4 i_o i) = \log(K_1 K_2 x^2) \quad (2)$$

$$K_3 K_4 i_o i = K_1 K_2 x^2 \quad (3)$$

$$i_o i = (K_1 K_2 / K_3 K_4) x^2 \quad (4)$$

$$K^2 = (K_1 K_2 / K_{K3} K_4) \quad (5)$$

$$i_o i = K^2 x^2 \quad (6)$$

$$x = x_o + x_p \quad (7)$$

Because no dc component can be supplied by the winding 4.

$$x_o = 0 \quad (8)$$

and $x = x_p = f(t) \quad (9)$ $$i = i_o + i_{ac} \quad (10)$$

$$i_{ac} = f'(t) \quad (11)$$

$$i_o(i_o + i_{ac}) = K^2 x^2_p \quad (12)$$

$$i_o^2 + \int_0^T \frac{i_o}{T} f'(t)\,dt = K^2 \int_0^T \frac{1}{T} f(t)^2 dt \quad (13)$$

$$\int_0^T \frac{1}{T} f'(t)\,dt = 0 \quad (14)$$

by definition $$i_o = K \sqrt{\int_0^T \frac{1}{T} f(t)^2 dt} \quad (15)$$

by definition $$\sqrt{\int_0^T \frac{1}{T} f(t)^2 dt} = x_{RMS} \quad (16)$$

therefore $$i_o = K x_{RMS} \quad (17)$$

With modern transistors, the value of K approaches 1 and can be expected to remain within ±0.05 which means that $i_o$ equals the RMS value of the quantity applied to the input transformer 1 with an error not greater than ± 2.2 percent which error can be compensated for by adjusting the calibrating resistor 21A.

Figure 3:
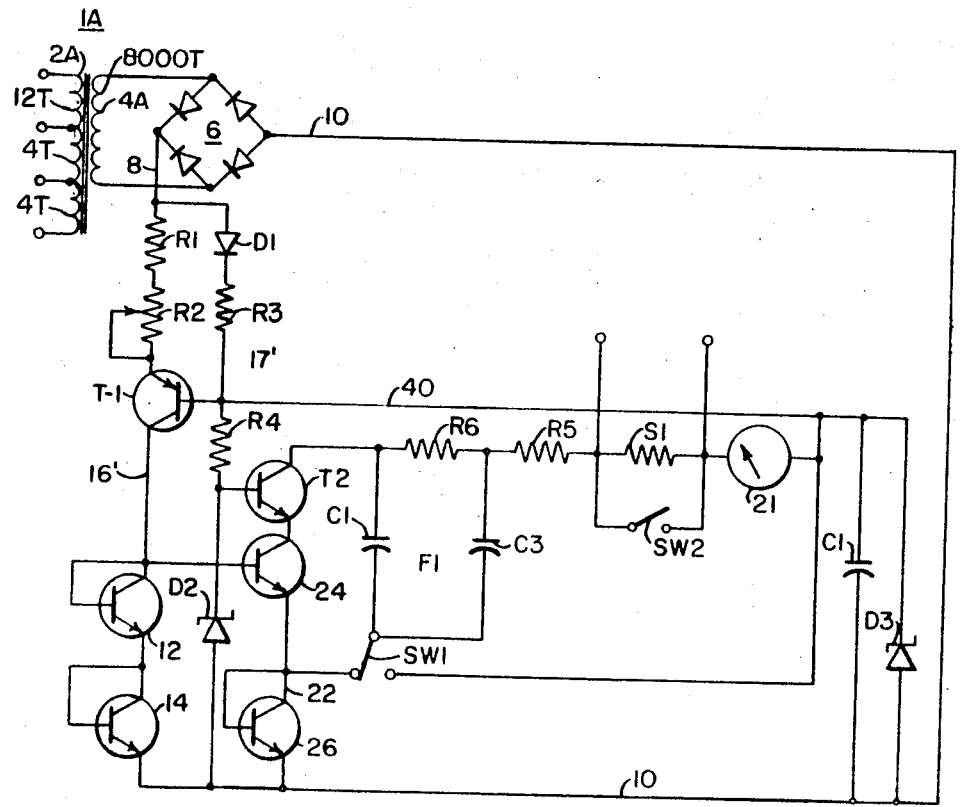

FIG. 3 illustrates a device which functions as above described but which embodies a current splitting network which considerably simplifies the design of the current transformer. This is because only micro amperes are required for the solid state devices 12, 14, 24 and 26. Assuming that 200 microamperes is the current required for the devices 12 and 14 and a single turn primary winding 2A carrying 10 amperes is used, the secondary winding 4A would require 50,000 turns. It is of course possible to build such a transformer but it would be bulky and expensive. With a current splitting device, the current transformer will be smaller even though it delivers more amperes. For example, assuming a turns ratio as set forth in FIG. 3 wherein four turns of the 20 turn primary is used with 8,000 turns on the secondary a current flow of 10 ampere in the four turn primary will cause 5,000 microamperes to flow in the secondary winding 4A. This current is split between two paths 16' and 17' with 200 microamperes flowing through path 16' and the balance flowing through path 17'. The path 16' includes a resistor R1, a variable resistor R2, the emitter-collector circuit of a transistor T-1 and the devices 12 and 14. The path 17' includes a diode D1, resistor R3, a resistor R4 and a Zener diode D2. A positive bus 40 extends from the bus 8 through the diode D1 and resistor R3 and is maintained at a fixed potential above the negative bus 10 by a Zener diode D3 shunted by a capacitor C1.

The indicating instrument 21 has one terminal connected to the bus 40 and its other terminal connected through a suitable instrument shunt S1, resistors R5 and R6 of a filter F1, and the collector-emitter of a transistor T-2 to the devices 24 and 26 of the antilog circuit.

The base of the transistor T-1 is connected to bus 8 through the resistor R3 and diode D1 whereby the current ratio between the circuits 16' and 17' is maintained. The base of the transistor T-2 is connected to the common point between the resistor R4 and Zener diode D2 whereby the substantially constant voltage established by the diode D2 will maintain a substantially constant potential across the antilog circuit 22. The filter network F1 also includes capacitors C2 and C3 and is effective when switch SW1 is in its illustrated or $a$ position to cause the entire alternating component of the current flowing in the antilog circuit 22 to circulate through the device 24 with only the DC component flowing through the device 26, shunt S1 and instrument 21. The filter network F1 permits the use of capacitors C2 and C3 having a much lower capacitance than that required by the capacitor 28 in FIG. 1.

With switch SW1 in its other or $b$ position the filter network F1 is no longer effective to prevent the flow of the alternating component through the device 26 and this alternating component flows through both devices 24 and 26. Under this condition the instrument or meter 21 will indicate the average rather than the RMS value of the input quantity to the transformer 1A. This is somewhat like the circuit shown in FIG. 6 of U.S. Pat. No. 3,152,250 to G. E. Platzer, Jr.

That the meter 21 will be energized with the quantity directly proportional to the average value of the input quantity is shown by the following mathematical treatment in which like designations represent like quantities to those set forth in the preceding mathematical treatment of FIG. 1.

$$\log K_3\, i + \log K_4\, i = \log K_1\, x + \log K_2\, x \qquad (18)$$

$$\log (K_3\, K_4\, i^2) = \log (K_1\, K_2\, x^2) \qquad (19)$$

$$K_3\, K_4\, i^2 = K_1\, K_2\, x^2 \qquad (20)$$

$$K^2 = K_1\, K_2 / K_3\, K_4 \qquad (21)$$

$$i^2 = (K_1\, K_2 / K_3\, K_4)\, x^2 \qquad (22)$$

$$i^2 = K^2\, x^2 \qquad (23)$$

$$i = K_x \qquad (24)$$

$$x = x_p = f(t) \qquad (9)$$

$$i = i_o + i_{ac} \qquad (10)$$

$$i_{ac} = f'(t) \qquad (11)$$

$$i_o + f'(t) = k\, f(t) \qquad (25)$$

$$i_o + \int_0^T \frac{1}{T} f'(t)\, dt = K \int_0^T \frac{1}{T} f(t)\, dt \qquad (26)$$

$$\int_0^T \frac{1}{T} f'(t)\, dt = 0 \qquad (14)$$

by definition $$\int_0^T \frac{1}{T} f(t)\, dt = x \text{ average} \qquad (27)$$

therefore $$i_o = Kx \text{ average} \qquad (28)$$

A switch SW2 may be closed to short out the shunt or resistor S1 as desired.

It will, therefore, be apparent that there has been disclosed an inexpensive simple RMS transducer wherein the direct current output component is directly proportional to the RMS magnitude of the alternating quantity supplied thereto and wherein small relatively inexpensive elements may be utilized.

What is claimed and is desired to be secured by United States Letters Patent is as follows:

1. An RMS transducer comprising a pair of input terminals, a first series circuit comprising first paths of first and second devices connected to said input terminals for energization therefrom, a second series circuit comprising first paths of third and fourth devices, each of said first paths being characterized by the fact that the voltage established across said first path is proportional to the log of the current flow through said first path, the magnitude of the proportion and of the base of the log of all of said devices being substantially identical, control means energized by the sum of the magnitudes of said established voltage of said first paths of said first series circuit, said control means being coupled to said second series circuit for regulating the current through said second series circuit as the antilog function of the sum of the magnitudes of said established voltages of said first paths of said first series circuit, and shunting means associated with one of said devices of said second series circuit for shunting around its said first path the alternating component of the current through said second series circuit.

2. The combination of claim 1 in which said first and second and third devices are solid state devices operating as diodes, said fourth device is a solid state triode, and said control means is connected to said fourth device.

3. The combination of claim 2 in which said sum of the magnitudes of said logs is an electrical voltage, and in which said devices of said second series circuit are arranged such that any current flow caused by said voltage flows through both of said devices of said second circuit.

4. The combination of claim 3 in which all of said devices are transistors and in which said shunting means is a capacitor.

5. The combination of claim 4 in which a source of unidirectional potential is connected to energize said second circuit, and a direct current sensing instrument is connected to respond to the flow of direct current through said second circuit.

6. The combination of claim 5 in which there is provided a full wave rectifier and a transformer, said transformer being connected to said input terminals through said rectifier.

7. A transducer providing a unidirectional electrical quantity proportional to the RMS value of a pulsating quantity, said transducer comprising a pair of input terminals for energization by said pulsating quantity, a plurality of current flow devices having a current path therethrough, each of said devices being characterized by the fact that the current flow through its said path establishes a first control quantity which is proportional to the log of the current therethrough, the proportion and the base of the log of all of said devices being substantially identical, means connecting said paths of a first and a second of said devices to provide a first series circuit connected to said input terminals, second means connecting said path of a third and a fourth of said devices to provide a second series circuit, current flow controlling means controlling the current flow through said second series circuit in accordance with the magnitude of a second control quantity supplied thereto, means connecting said current flow controlling means to said first series circuit for energization thereof by the magnitude of the sum of said first quantities of said first and second devices, the magnitude of said second control quantity being proportional to the magnitude of said sum, and means preventing the flow of the alternating current component, of the current in said second series circuit, through said path of one of said devices of said second series circuit.

8. The combination of claim 7 in which said pulsating quantity is an alternating quantity, a rectifier means is interposed between said input terminals and said first series circuit, said rectifier means being effective to permit current flow through said first series circuit solely in a first direction, and in which there is provided a source of unidirectional potential for current flow through said second series circuit.

9. The combination of claim 8 in which said third device is a solid state triode comprising a main path including its said first path and a control path including its said first path, said second series circuit including said main path, said current flow controlling means including said control path.

10. The combination of claim 9 in which said means which prevents the flow of the alternating component is a capacitor connected in parallel with said current path of said one device.

11. The combination of claim 10 in which said one device is said third device.

12. The combination of claim 10 in which said one device is said fourth device.

13. In combination, first and second and third current conducting devices, each of said devices having a main circuit and characterized by the fact that the voltage developed across said device of its said main circuit is substantially proportional to the log of the current flowing through its said main circuit, a fourth regulated current conducting device having a main circuit and a control circuit which controls the magnitude of the current flowing in said main circuit as a function of the magnitude of a first electrical quantity applied to said control circuit, each said circuit of said fourth device being characterized by the fact that the voltage developed thereacross is substantially proportional to the log of the current flowing therethrough, input means adapted to supply a rectified quantity to said first current conducting device whereby unidirectional current flows through said first device in accordance with the instantaneous magnitude of said sinusoidal quantity, input means adapted to supply a rectified quantity to said second current conducting device whereby current flows through said second device in accordance with the instantaneous magnitude of the said quantity applied thereto, a circuit means connected to said first and second devices and connected to said control circuit of said fourth device, said last named circuit means being effective to energize said control circuit with said first signal at a magnitude which is a function of the sum of the magnitudes of the potentials which appear across said first and second devices, an output circuit comprising the series connection of said main circuits of said third and fourth devices, and means eliminating the alternating current component of the current in said output circuit from one of said main circuits of said output circuit.

14. The combination of claim 13 in which said means which eliminates the flow of the alternating current component is a capacitor connected in shunt with said one main circuit.

15. The combination of claim 14 in which said devices each include a p-n semiconductor junction to provide said voltage developed thereacross.

16. The combination of claim 15 in which said p-n junction of said fourth device is located in each of its said circuits.

17. The combination of claim 13 in which each of said devices is a transistor, each said transistor includes a base and a collector and an emitter, said first and said second and third devices each having their said base connected to their said collectors.

18. The combination of claim 15 in which all of said p-n junctions provide substantially the same log value with respect to the current flow therethrough.

19. The combination of claim 13 in which there is provided a source of unidirectional potential for said output circuit, said means which eliminates the flow of the alternating current component comprises a resistor capacitor network comprising at least a pair of capacitors and a pair of resistors, said resistors being connected in series and between a selected main circuit of said output circuit and said source of potential, a first of said capacitors being connected between a common connection of said resistors and a first point in said output circuit, a second of said capacitors being connected between the common connection of said resistors and said selected main circuit and said first point.

20. The combination of claim 19 in which a load device is connected into said output circuit intermediate said resistors and said source of potential, and in which locating means selectively determines the location of said first point in said output circuit.

21. The combination of claim 20 in which said locating means in a first condition determines the location of said first point to be intermediate said main circuits of said output circuit and in a second condition determines said first point to be intermediate said load device and said source of potential.

22. A transducer comprising a current transformer having output terminals; a full wave rectifying network having alternating current input terminals connected to said transformer output terminals; said network having direct current output terminals; a network having first and second paths connected between said direct current terminals; said first path including in series circuit and in the order named, a first resistor, the p-n junction of a first device, and a log quantity establishing network comprising the p-n junctions of second and third devices; said second path including in series circuit and in the order named a second and third resistor and a first voltage determining element; said second path further including a second voltage determining element in parallel with said second resistor and said first voltage determining element; a third path connected in shunt circuit with said second voltage determining element and including in series circuit and in the order names a load device, the p-n junction of a fourth device and an antilog quantity establishing network comprising the p-n junctions of a fifth and a sixth device; means connecting a control electrode of said first device to the common connection between said second and said third resistors; means connecting the control electrode of said fourth device the common connection of said third resistor and said first voltage determining element; and means connecting the control electrode of said fifth device to the common connection of said first device and said p-n junction of said second device.

23. The combination of claim 22 which includes a capacitive network connected in parallel with at least one p-n junction of said third path.

24. The combination of claim 22 which includes a capacitive network connected in parallel with the p-n junction of said fourth and said fifth devices.

25. The combination of claim 22 which includes an alternating current conducting network, and means selectively connecting said alternating current network in parallel with the p-n junctions of said fourth and fifth devices and in parallel with said load device.

26. The combination of claim 24 in which said capacitive network includes fourth and fifth resistors and first and second capacitors, said fourth and fifth resistors being connected in series in said third path intermediate said load device and the p-n junctions of said fourth device, said first capacitor being connected between the common point of said fourth and fifth resistors and a first common point between the p-n junction of said fifth device and the p-n junction of said sixth device, said second capacitor being connected between the common point of one of said fourth and fifth resistors and said first common point.

27. The combination of claim 26 in which means is provided to disconnect said capacitors from said first common point and to connect said capacitors to a second common point intermediate said load device and said second voltage determining element.

28. The combination of claim 22 in which said devices having the p-n junctions are all transistors, said control electrode of said first and said fourth and said fifth devices being bases of the respective said devices, the bases of said second and said third and said sixth devices being connected to one of said collector and emitter thereof to cause said just-named devices to operate as diodes.

* * * * *